(12) United States Patent
Oka et al.

(10) Patent No.: US 10,750,040 B2
(45) Date of Patent: Aug. 18, 2020

(54) IMAGE READING APPARATUS

(71) Applicant: CANON KABUSHIKI KAISHA, Tokyo (JP)

(72) Inventors: Yushi Oka, Abiko (JP); Asahiro Nakayoshi, Matsudo (JP); Akiko Kanno, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/217,823

(22) Filed: Dec. 12, 2018

(65) Prior Publication Data

US 2019/0199874 A1 Jun. 27, 2019

(30) Foreign Application Priority Data

Dec. 25, 2017 (JP) .................. 2017-248450

(51) Int. Cl.
*G06F 15/00* (2006.01)
*H04N 1/00* (2006.01)
*H04N 1/10* (2006.01)
*H04N 1/193* (2006.01)

(52) U.S. Cl.
CPC ..... *H04N 1/00708* (2013.01); *H04N 1/00702* (2013.01); *H04N 1/00766* (2013.01); *H04N 1/00782* (2013.01); *H04N 1/1061* (2013.01); *H04N 1/193* (2013.01)

(58) Field of Classification Search
CPC ........... H04N 1/00708; H04N 1/00702; H04N 1/00766; H04N 1/00782; H04N 1/1061; H04N 1/193
USPC ........................................................ 358/488
See application file for complete search history.

(56) References Cited

U.S. PATENT DOCUMENTS

| | | | |
|---|---|---|---|
| 8,310,733 B2 | 11/2012 | Sekiguchi et al. ............. 358/474 |
| 8,432,586 B2 | 4/2013 | Hamano et al. .............. 358/505 |
| 10,038,801 B2 | 7/2018 | Nakayoshi et al. ........................ H04N 1/00801 |
| 10,110,776 B2 | 10/2018 | Sunada et al. ...... H04N 1/00588 |
| 2006/0028696 A1* | 2/2006 | Michiie ................ G03G 15/607 358/474 |
| 2010/0149603 A1* | 6/2010 | Maeda ................ H04N 1/00681 358/449 |
| 2013/0044357 A1* | 2/2013 | Igawa .................. H04N 1/0071 358/474 |

(Continued)

FOREIGN PATENT DOCUMENTS

| | | |
|---|---|---|
| JP | H03-138633 | 6/1991 |
| JP | 2006-135856 | 5/2006 |

*Primary Examiner* — Mark R Milia
(74) *Attorney, Agent, or Firm* — Venable LLP

(57) ABSTRACT

An image reading apparatus includes a line image sensor receiving a light reflected from an original illuminated by a light source to generate image data, an original size detector disposed away from an original positioning portion by a predetermined distance in a sub-scanning direction, an original image reading start instructing unit outputting an image reading start instruction for starting an image reading operation when being depressed by a user, and a controller determining a size of the original based on detection results of the line image sensor and the original size detector when the size of the original is not stored in a memory in a case in which the controller receives the image reading start instruction in a state in which it is detected that an angle of a pressure plate is greater than a predetermined angle.

7 Claims, 15 Drawing Sheets

(56) References Cited

U.S. PATENT DOCUMENTS

2017/0214816 A1  7/2017  Yamakawa et al. .......................... H04N 1/00891
2018/0007223 A1  1/2018  Hamada et al. ... H04N 1/00034
2018/0084146 A1  3/2018  Mikami et al. .... H04N 1/00588
2018/0332183 A1  11/2018  Seki et al. ......... H04N 1/00997

* cited by examiner

FIG. 3

| ANGLE OF PRESSURE PLATE | OUTPUT OF FIRST SENSOR | OUTPUT OF SECOND SENSOR | STATE OF PRESSURE PLATE |
|---|---|---|---|
| $25 < \theta$ | OFF SIGNAL | OFF SIGNAL | OPEN STATE |
| $5 < \theta \leq 25$ | ON SIGNAL | OFF SIGNAL | CLOSING STATE |
| $0 \leq \theta \leq 5$ | ON SIGNAL | ON SIGNAL | CLOSED STATE |

| DETECTION POINT | DETECTED ORIGINAL SIZE |
|---|---|
| 301 | (ORIGINAL PRESENCE/ABSENCE) |
| 302 | (A6, A5R) |
| 303 | B6, B5R |
| 304 | A5, A4R |
| 305 | B5, B4 |
| 306 | A4, A3 |

| FIG.7A |
| FIG.7B |

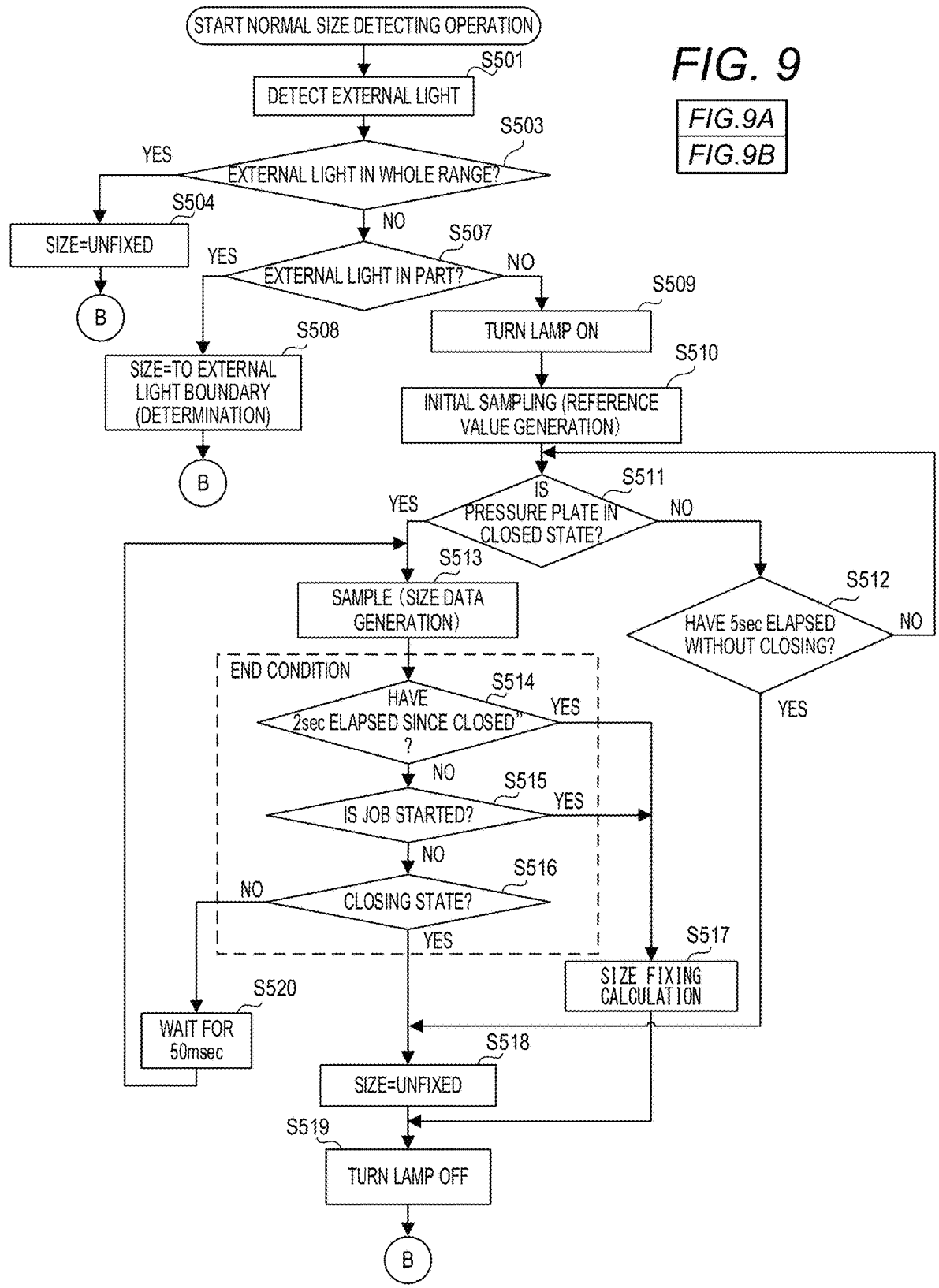

IMAGE READING APPARATUS

BACKGROUND OF THE INVENTION

Field of the Invention

The present invention relates to an image reading apparatus including an original size detector which detects a size of an original placed on a platen glass plate.

Description of the Related Art

Conventionally, as an image reading apparatus provided at an image forming apparatus such as a copier and a facsimile, there is an image reading apparatus which includes an original size detector for detecting a size of an original placed on a platen glass plate. To detect an open/closed state of a platen cover or an automatic original feeder (hereinafter, collectively referred to as a pressure plate), the image reading apparatus includes a first sensor which detects a first angle of the pressure plate and a second sensor which detects a second angle of the pressure plate. In the case in which an original does not exist on the platen glass plate, output of the original size detector is detected as "black" in a state in which the pressure plate is open, and output is detected as "white" in a state in which the pressure plate is closed. Therefore, in the case in which "white→black", "white→white" or "black→black" is detected as a result of the pressure plate being open or closed, there exists an original at a detecting position at which the original size detector is provided. Accordingly, it is possible to detect a size of an original placed on the platen glass plate based on opening and closing of the pressure plate and output of the original size detector (Japanese Patent Application Laid-Open No. 2006-135856).

However, if image reading operation is executed as the pressure plate is kept open (an angle of the pressure plate is equal to or greater than the first angle) to read a bound book, or the like, because output of the original size detector in a state in which the pressure plate is closed cannot be obtained, the size of the original cannot be detected. Therefore, when the pressure plate is open, normally, there is a method for detecting a size of an original using an original size detector (Japanese Patent Application Laid-Open No. H03-138633).

However, in the method in which the size of the original is always detected when the angle of the pressure plate is equal to or greater than a predetermined angle, in the case in which the user leaves the pressure plate open, because power is kept supplied to the original size detector, there is a problem that power consumption becomes large.

SUMMARY OF THE INVENTION

To solve the above-described problem, an image reading apparatus according to an embodiment of the present invention comprises:
a platen glass plate on which an original is to be placed;
an original positioning portion which determines a position of the original to be placed on the platen glass plate;
a pressure plate which is rotatably provided so as to open and close the platen glass plate and which holds the original placed on the platen glass plate;
a light source which illuminates the original placed on the platen glass plate;
a line image sensor which includes a plurality of light receiving portions arranged side by side in a main scanning direction and which receives a light reflected from the original illuminated by the light source to generate image data;
a sensor which detects that an angle formed by the pressure plate and the platen glass plate is equal to or less than a predetermined angle;
an original size detector which is disposed at a detecting position which is away from the original positioning portion by a predetermined distance in a sub-scanning direction orthogonal to the main scanning direction;
an original image reading start instructing unit which outputs an image reading start instruction for starting an image reading operation of reading an image of the original when the original image reading start instructing unit is depressed by a user;
a memory which stores a size of the original; and
a controller which, in a case in which the controller receives the image reading start instruction from the original image reading start instructing unit in a state in which it is detected from a detection result of the sensor that the angle of the pressure plate is greater than the predetermined angle, when the size of the original is not stored in the memory, determines the size of the original based on a detection result of the line image sensor and a detection result of the original size detector.

Further features of the present invention will become apparent from the following description of exemplary embodiments with reference to the attached drawings.

BRIEF DESCRIPTION OF THE DRAWINGS

FIG. 3 is a diagram illustrating output of the first sensor and the second sensor and a state of a pressure plate.

FIG. 9 which is composed of FIG. 9A

DESCRIPTION OF THE EMBODIMENTS (Image Reading Apparatus)

Figure 1A:
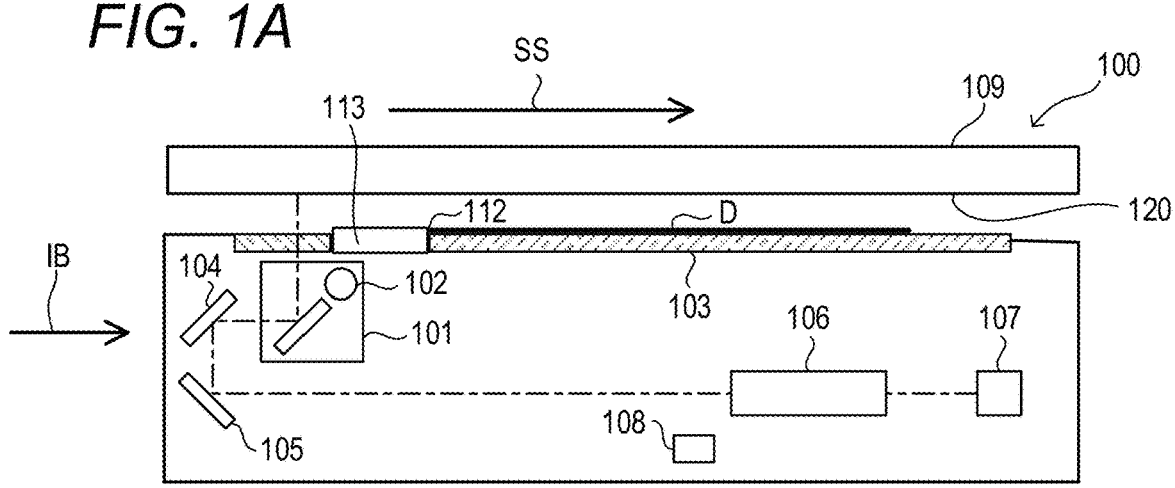
FIG. 1A, FIG. 1B and FIG. 1C are cross-section diagrams of an image reading apparatus.
Figure 1B:
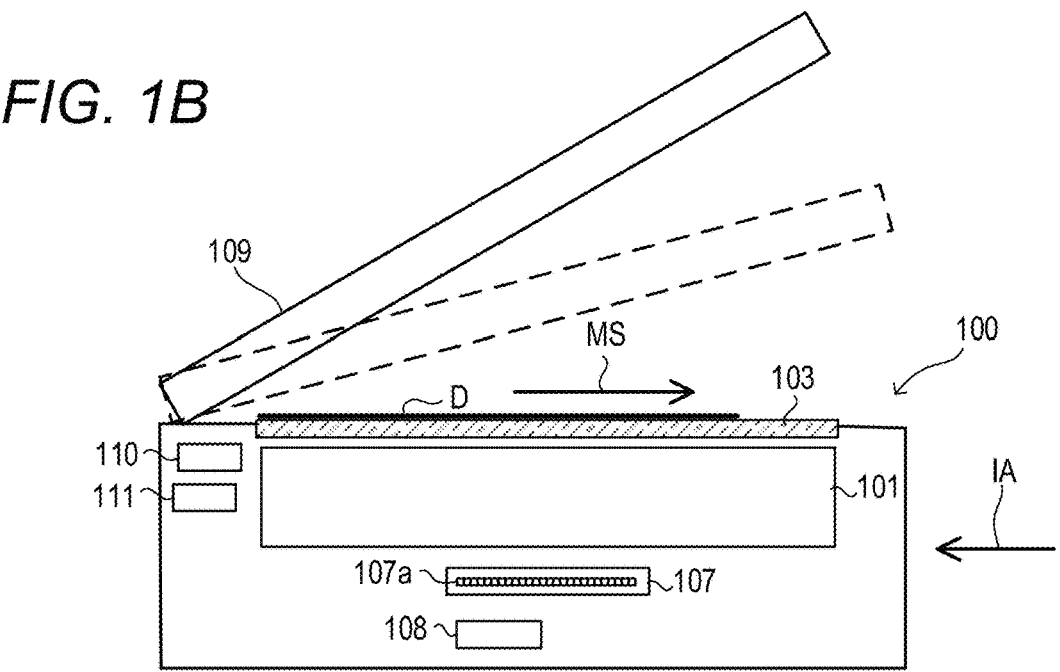
Figure 1C:
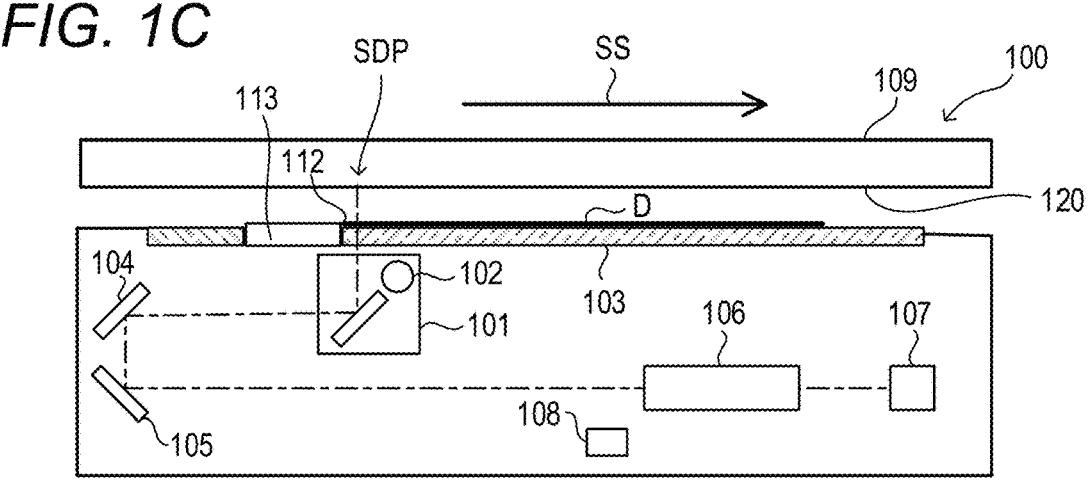

An image reading apparatus 100 according to an embodiment of the present invention will be described below with reference to the accompanying drawings. FIG. 1A, FIG. 1B and FIG. 1C are cross-section diagrams of the image reading apparatus 100. FIG. 1A and FIG. 1C are cross section diagrams of the image reading apparatus 100 seen from a front side in a direction indicated with an arrow IA in FIG. 1B. FIG. 1B is a cross-section diagram of the image reading apparatus 100 seen from a left side in a direction indicated with an arrow IB in FIG. 1A. The image reading apparatus 100 includes a scanner unit 101 including a lamp (light source) 102, a platen glass plate 103, a reflecting mirror 104, a reflecting mirror 105, a lens 106, a line sensor 107 which converts a light receiving amount to an electrical signal, a reflective type sensor 108 and a pressure plate 109. The reflective type sensor 108 as an original size detector detects an original D placed on the platen glass plate 103 as an original platen. The pressure plate 109 as a platen cover is rotatably provided at the image reading apparatus 100 so as to open and close the platen glass plate 103, and holds the original D placed on the platen glass plate 103. The lamp 102 as an illumination unit illuminates the original D placed on the platen glass plate 103. The line sensor 107 is a line image sensor in which a plurality of light receiving portions 107a are arranged in a main scanning direction MS. The line sensor 107 as an image reading unit receives reflected light from the original D illuminated by the lamp 102 to read an image of the original D in the main scanning direction MS, and generates a read-out signal as image data. Further, the line sensor 107 reads the image of the original D according to movement of a scanner unit 101 in a sub-scanning direction SS which is orthogonal to the main scanning direction MS, and generates a read-out signal as image data.

Note that the image reading apparatus 100 may include an original tray (not illustrated) on which an original is to be placed, and may include an automatic original feeder (not illustrated) on the pressure plate 109, which feeds an original from the original tray to the platen glass plate 103.

A white reference plate 113 is provided on the platen glass plate 103. An original abutting portion 112 of the white reference plate 113 is an original positioning portion which positions a tip of the original in the sub-scanning direction SS of the original D by being abutted by the original D placed on the platen glass plate 103. A white reference for a reading calibration of the scanner unit 101 is provided on a lower surface of the white reference plate 113. An original size index is provided on an upper surface of the white reference plate 113. As illustrated in FIG. 1B, a first pressure plate opening and closing sensor (hereinafter, referred to as a first sensor) 110 and a second pressure plate opening and closing sensor (hereinafter, referred to as a second sensor) 111 are provided at the image reading apparatus 100. The first sensor 110 detects a first angle 25° (predetermined angle) of the pressure plate 109. The second sensor 111 detects a second angle 5° of the pressure plate 109. The second angle 5° is smaller than the first angle 25°.

(Pressure Plate Opening and Closing Sensor)

Figure 2A:
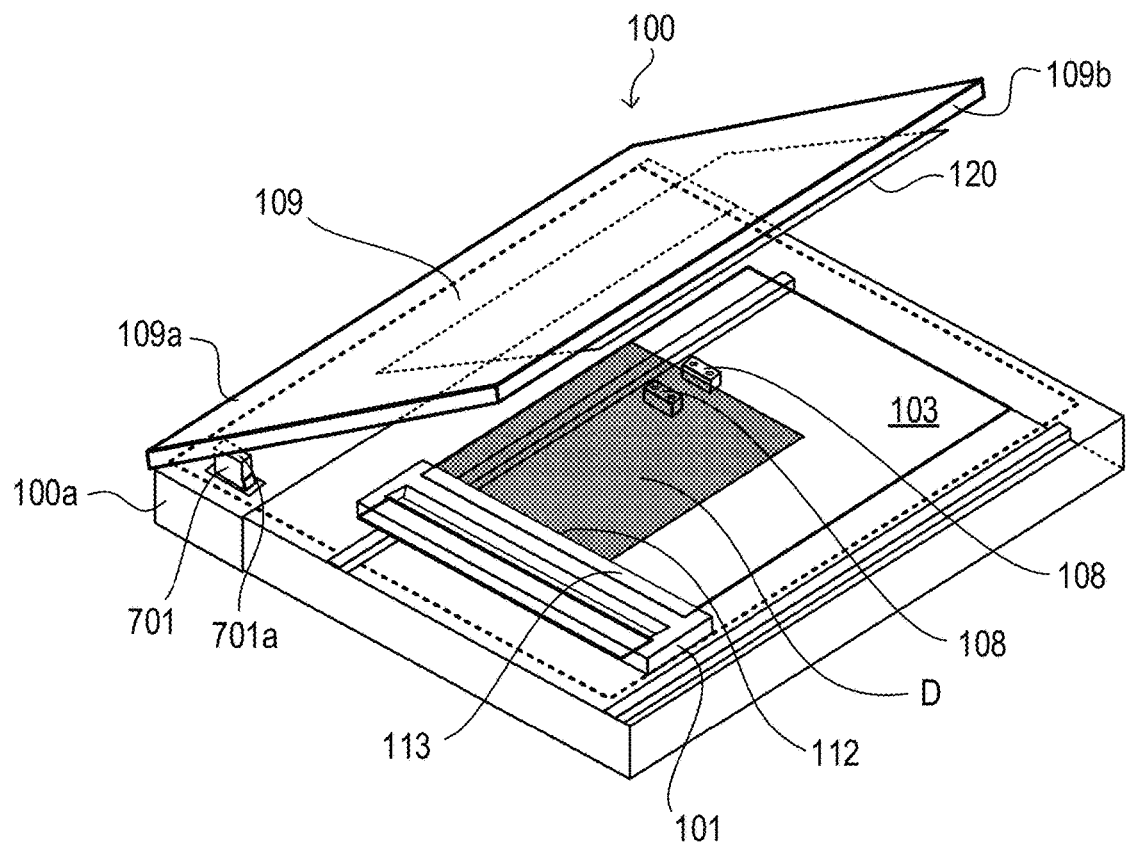
FIG. 2A, FIG. 2B, FIG. 2C and FIG. 2D are explanatory diagrams of a first sensor and a second sensor.

An example of the first sensor 110 and the second sensor 111 as position sensors which detect that the angle of the pressure plate 109 falls within a predetermined angle range will be described with reference to FIG. 2A, FIG. 2B, FIG. 2C and FIG. 2D. FIG. 2A, FIG. 2B, FIG. 2C and FIG. 2D are explanatory diagrams of the first sensor 110 and the second sensor 111. FIG. 2A is a perspective view of the image reading apparatus 100. One end portion 109a of the pressure plate 109 as an original cover is rotatably attached to a body 100a of the image reading apparatus 100 with a hinge, or the like. The pressure plate 109 rotates around a pivotal axis of the one end portion 109a, and the other end portion 109b of the pressure plate 109 can be open and closed with respect to the body 100a of the image reading apparatus 100. A flag 701 is provided at the body 100a in the vicinity of the one end portion 109a of the pressure plate 109. An upper end portion 701a of the flag 701 is configured to abut on the pressure plate 109 so as to be able to reciprocate in a vertical direction in conjunction with opening and closing operation of the pressure plate 109. The first sensor 110 and the second sensor 111 are provided in the vicinity of the flag 701 inside the body 100a.

Figure 2B:
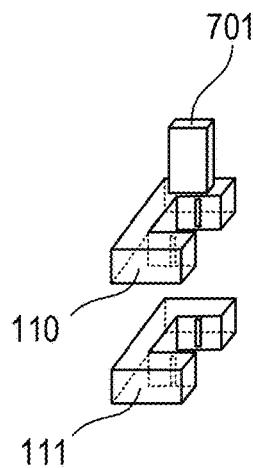
Figure 2C:
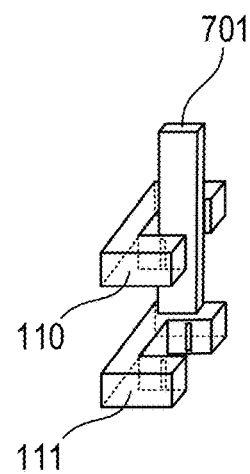
Figure 2D:
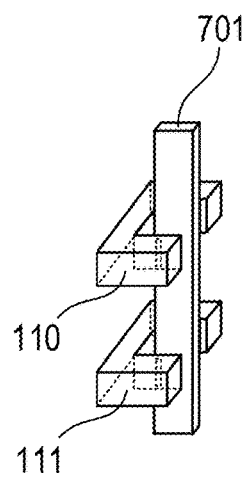

FIG. 2B, FIG. 2C and FIG. 2D are diagrams illustrating operation of the first sensor 110, the second sensor 111 and the flag 701. The first sensor 110 and the second sensor 111 are arranged in a longitudinal direction. The second sensor 111 is disposed below the first sensor 110. The pressure plate 109 abuts on the flag 701 when the pressure plate 109 is closed by the user from a fully open state. Thereafter, the flag 701 moves downward in conjunction with closing operation of the pressure plate 109. The first sensor 110 and the second sensor 111 are respectively configured with photointerrupters. The photointerrupter includes a light emitting portion and a light receiving portion. When light emitted from the light emitting portion is blocked by the flag 701, the photointerrupter outputs an ON signal. When light emitted from the light emitting portion is not blocked by the flag 701, the photointerrupter outputs an OFF signal.

In the case in which the angle of the pressure plate 109 is greater than 25°, the flag 701 blocks neither the photointerrupter of the first sensor 110 nor the photointerrupter of the second sensor 111 as illustrated in FIG. 2B. Here, the angle (opening angle) of the pressure plate 109 is an angle formed by the pressure plate 109 and the platen glass plate 103. When the pressure plate 109 is in a fully closed state, the angle of the pressure plate 109 is 0°. In the case in which the angle of the pressure plate 109 is equal to or less than 25°, the flag 701 blocks the photointerrupter of the first sensor 110 as illustrated in FIG. 2C. In the case in which the angle of the pressure plate 109 is equal to or less than 5°, the flag 701 blocks the photointerrupter of the first sensor 110 and the photointerrupter of the second sensor 111 as illustrated in FIG. 2D. In this manner, an open/closed state of the pressure plate 109 is detected based on output of the first sensor 110 and the second sensor 111.

FIG. 3 is a diagram illustrating output of the first sensor 110 and the second sensor 111 and a state of the pressure plate 109. As illustrated in FIG. 3, in the case in which the angle of the pressure plate 109 is greater than 25°, the first sensor 110 outputs an OFF signal, the second sensor 111 outputs an OFF signal, and the pressure plate 109 is in an open state. In the case in which the angle of the pressure plate 109 is greater than 5° and equal to or less than 25°, the first sensor 110 outputs an ON signal, the second sensor 111 outputs an OFF signal, and the pressure plate 109 is in a closing state. In the case in which the angle of the pressure plate 109 is equal to or less than 5°, the first sensor 110 outputs an ON signal, the second sensor 111 outputs an ON signal, and the pressure plate 109 is in a closed state.

(Scanner Controller)

Figure 4:
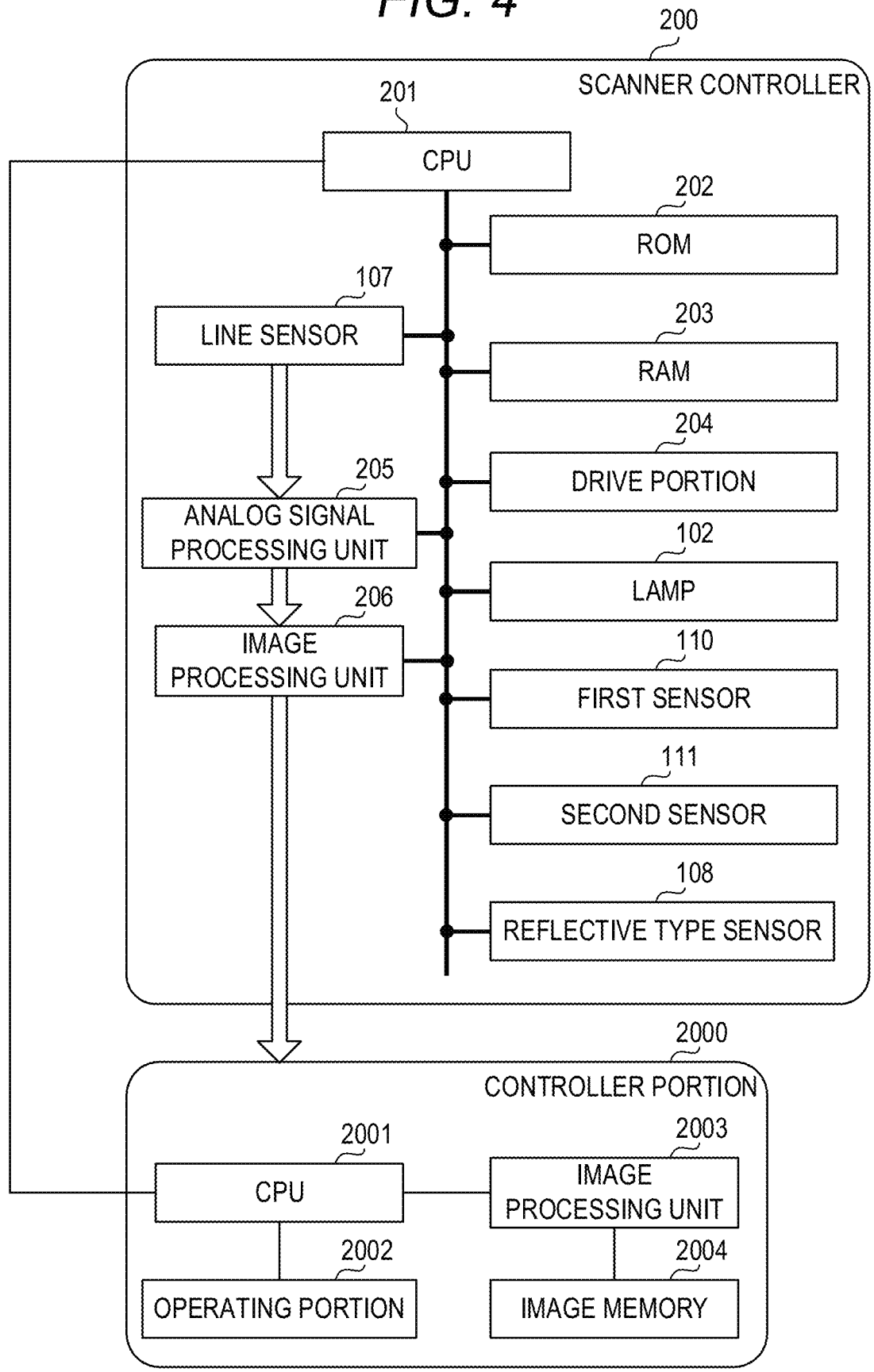
FIG. 4 is a block diagram of a scanner controller and a controller portion.

A scanner controller 200 which controls the image reading apparatus 100 will be described below. FIG. 4 is a block diagram of the scanner controller 200 and a controller portion 2000. The image reading apparatus 100, which is controlled by the scanner controller 200, causes the scanner unit 101 to perform scanning in the sub-scanning direction SS to read the original D placed on the platen glass plate 103 and outputs the read image signal. A back side 120 of the pressure plate 109 is white. In the case in which an original does not exist, because light from the scanner unit 101 is not reflected when the pressure plate 109 is open, and nothing is input to the line sensor 107, the output image signal is "black". Meanwhile, when the pressure plate 109 is closed, light from the scanner unit 101 is reflected at the back side 120 of the pressure plate 109 and input to the line sensor, and output as "white". In this manner, in a portion in which "an original does not exist", a difference occurs in the output image signal between when the pressure plate 109 is open and when the pressure plate 109 is closed. Meanwhile, in a state in which the original D is placed on the platen glass plate 103, there is no change in reflected light of light from the scanner unit 101 regardless of the open/closed state of the pressure plate 109, and there is no difference in the output image signal.

As illustrated in FIG. 4, the scanner controller 200 includes a CPU 201, a ROM 202, a RAM 203, a drive portion 204, an analog signal processing unit 205 and an image processing unit 206. The CPU 201 as a controller is electrically connected to the ROM 202, the RAM 203, the drive portion 204, the analog signal processing unit 205 and the image processing unit 206. Further, the CPU 201 is electrically connected to the drive portion 204, the lamp 102, the first sensor 110, the second sensor 111, the reflective type sensor 108 and the line sensor 107. The CPU 201 executes a program stored in the ROM 202 to control the system. The RAM 203 is used as a work area of the CPU 201. The drive portion 204, which is controlled by the CPU 201, causes the scanner unit 101 to move a desired position. In the case in which an image is read, first, the scanner unit 101 is moved to a position of the white reference plate 113 by the drive portion 204, the lamp 102 is turned on, the white reference plate 113 is read by the scanner unit 101, and known shading correction processing is executed. After execution of the shading correction, the scanner unit 101 is caused to perform scanning in the sub-scanning direction SS in a state in which the lamp 102 is turned on, and an image of the original D is read with the line sensor 107 assuming that there is a tip of the original at the original abutting portion 112. The read analog image signal is converted into a digital image signal at the analog signal processing unit 205, and output to the controller portion 2000 through the image processing unit 206.

(Controller Portion)

The controller portion 2000 includes a CPU 2001, an operating unit 2002, an image processing unit 2003 and an image memory 2004. The digital image signal output to the controller portion 2000 is further subjected to image processing at the image processing unit 2003 inside the controller to be read image data.

(Operating Unit)

Figure 5A:
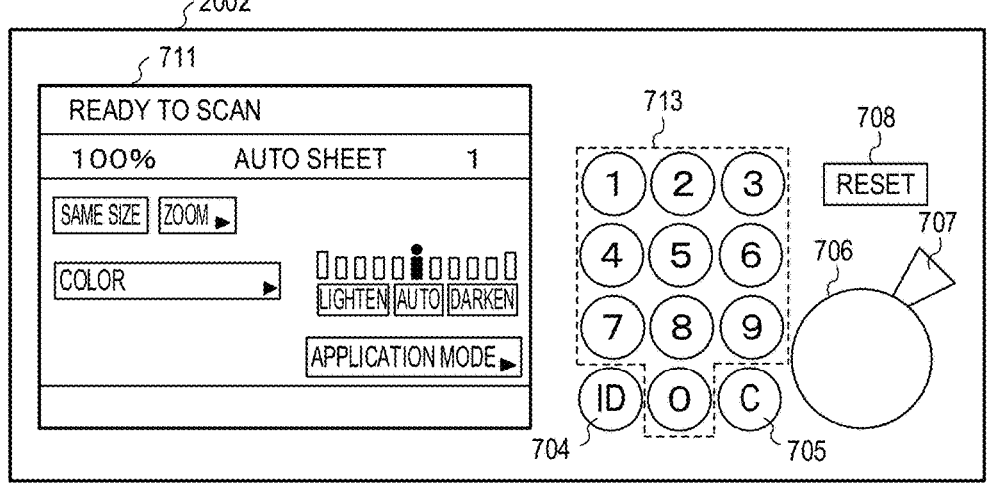
FIG. 5A, FIG. 5B, FIG. 5C and FIG. 5D are diagrams illustrating an operating unit and a display unit.

The operating unit 2002 included in the controller portion 2000 will be described below using FIG. 5A, FIG. 5B, FIG. 5C and FIG. 5D. FIG. 5A, FIG. 5B, FIG. 5C and FIG. 5D are diagrams illustrating the operating unit 2002 and a display unit 711. As illustrated in FIG. 5A, at the operating unit 2002, an ID key 704, a clear key 705, a start key 706, a stop key 707, a reset key 708, the display unit 711 and a numerical keypad 713 are provided. The start key 706 as an original image reading start instructing unit outputs an image reading start instruction for starting image reading operation when being depressed by a user. The stop key 707 is used to interrupt image reading operation. The numerical keypad 713 is used for inputting numbers. The ID key 704 is used for performing user authentication. The clear key 705 is used for clearing input numbers, or the like. The reset key 708 is used for initializing input setting. The display unit 711, which is a display apparatus including a built-in touch panel sensor, displays a softkey which can be operated by being touched by the user.

Figure 5B:
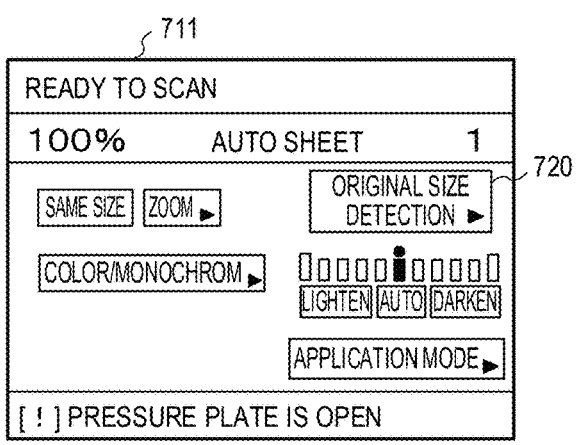
Figure 5C:
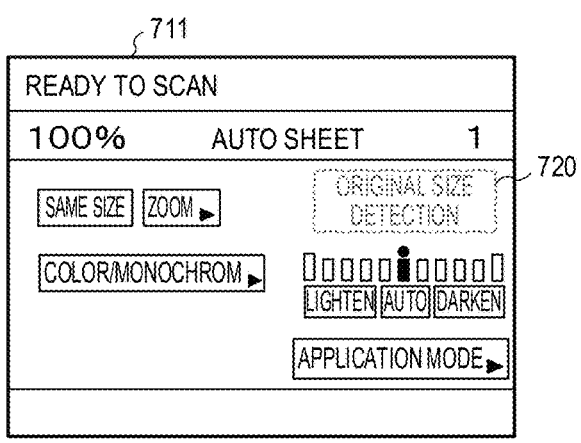
Figure 5D:
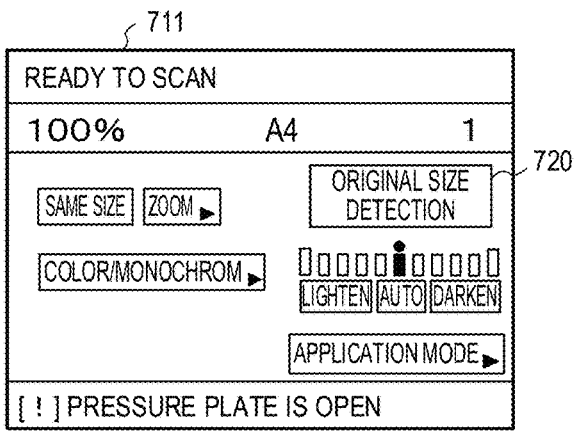

The display unit 711 at the operating unit 2002 illustrated in FIG. 5A indicates displayed content when the pressure plate 109 is in the closed state. When the pressure plate 109 is in the closed state, an original size detection softswitch 720 is not displayed at the display unit 711. FIG. 5B illustrates content displayed at the display unit 711 when the pressure plate 109 is in the open state. When the pressure plate 109 is in the open state, the original size detection softswitch 720 is displayed at the display unit 711, and a message indicating that the pressure plate 109 is in the open state is displayed at a lower portion of the display unit 711. FIG. 5C illustrates content displayed at the display unit when the state of the pressure plate 109 transitions from the open state to the closing state by being closed. The original size detection softswitch 720 disappears, and the message indicating that the pressure plate 109 is in the open state also disappears. Note that it is also possible to change a display form so that the original size detection softswitch 720 is difficult to be seen from the user and disable the original size detection softswitch 720 so as not to respond even if the original size detection softswitch 720 is touched. FIG. 5D illustrates the display unit 711 which displays original size information of "A4" detected through simple size detecting operation which will be described later.

When the user touches the softkey displayed at the display unit 711, the CPU 2001 stores information regarding the touched softkey in the RAM (memory) 2003 and performs image reading control based on the stored information. For example, the CPU 2001 selects an image reading mode according to a color/monochrome mode. The CPU 2001 and the CPU 201 include units which perform communication with each other. By making a notification of information from the CPU 201 to the CPU 2001 while issuing an instruction of image reading control from the CPU 2001 to the CPU 201, it is possible to change displayed content of the operating unit 2002. In the case in which the displayed content of the operating unit 2002 is changed in the original size detecting operation which will be described later, the CPU 201 issues a displayed content change notice to the CPU 2001. Further, the content input to the operating unit 2002 by the user is transmitted from the CPU 2001 to the CPU 201 as an operation information notice.

<Original Size Detecting Operation>

The original size detecting operation is implemented by moving the scanner unit 101 to a predetermined size detecting position and performing reading on the platen glass plate 103. FIG. 1C illustrates a state in which the scanner unit 101 moves to the size detecting position SDP. If the pressure plate 109 is open at an angle greater than 25°, as illustrated in FIG. 3, the first sensor 110 outputs an OFF signal, the second sensor 111 outputs an OFF signal, and the pressure plate 109 is put into the open state. When the state of the pressure plate 109 transitions to the open state, the scanner unit 101 is moved to the size detecting position SDP and is made to stand by.

Operation of closing the pressure plate 109 is executed by the user from this open state, and the angle of the pressure plate 109 changes to an angle smaller than 25°. If the angle of the pressure plate 109 changes to an angle smaller than 25°, as illustrated in FIG. 3, the first sensor 110 outputs an ON signal, the second sensor 111 outputs an OFF signal, and the state of the pressure plate 109 transitions from the open state to the closing state. If the angle of the pressure plate 109 changes to an angle smaller than 5° from the closing state, the first sensor 110 and the second sensor 111 output ON signals, and the state of the pressure plate 109 transitions to the closed state. If the state of the pressure plate 109 transitions to the closed state, the scanner unit 101 located at the size detecting position SDP emits light from the lamp 102, and the CPU 201 samples image output of the line sensor 107 based on the reflected light and change of output of the reflective type sensor 108.

Because emitted light is reflected by the original D regardless of the open/closed state of the pressure plate 109 at a portion in which the original D exists, a read-out signal from the line sensor 107 extending in the main scanning direction MS becomes substantially constant according to color of the original D regardless of an opening/closed angle of the pressure plate 109. If the original D is a white original, a white read-out signal is output regardless of the opening/closed angle of the pressure plate 109. If the original D is a black original, a "black" read-out signal is output regardless of the opening/closed angle of the pressure plate 109. Meanwhile, in the present embodiment, because the back side 120 of the pressure plate 109 is white, as the pressure plate 109 is closing, at a portion in which the original D does not exist, the read-out signal changes from "black" in a state in which there is no reflection object to "white" in a state in which the back side 120 of the pressure plate 109 is read. Therefore, it is possible to distinguish between a portion in which the original exists and a portion in which the original does not exist from whether or not there is change in the read-out signal from the line sensor 107, so that it is possible to determine a main scanning size of the original D placed on the platen glass plate 103.

In a similar manner, concerning the reflective type sensor 108 in the sub-scanning direction SS, there is no change in a read-out signal in association with opening and closing of the pressure plate 109 in the case in which the original D exists on the reflective type sensor 108, and the read-out signal changes as the pressure plate 109 is closing in the case in which the original does not exist. By this means, it is possible to determine the size of the original D in the sub-scanning direction SS.

Figures 6A, 6B:
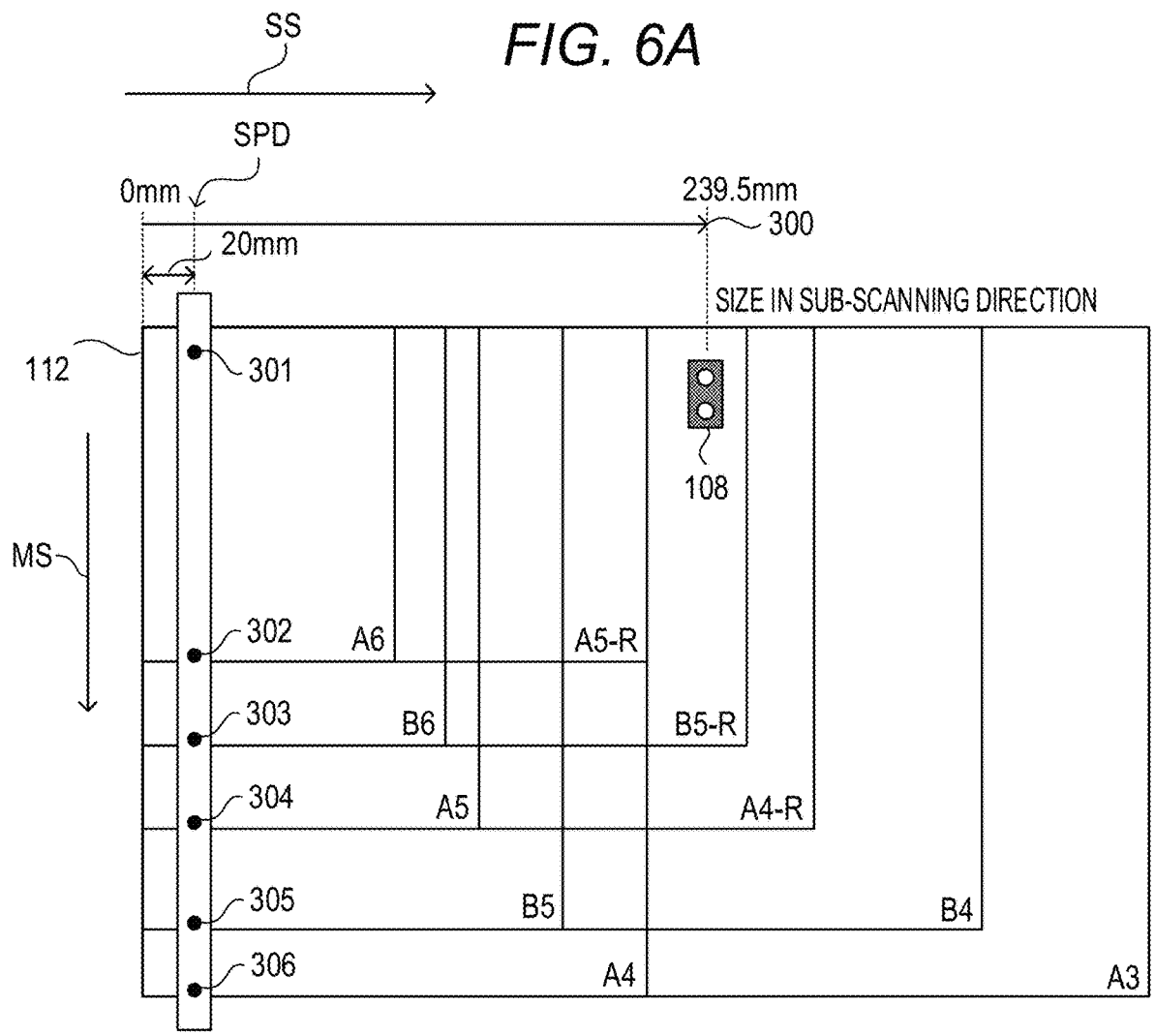
FIG. 6A and FIG. 6B are diagrams illustrating an example of setting of a main scanning direction change detecting position for detecting a size of an original.

FIG. 6A and FIG. 6B are diagrams illustrating an example of setting of a main scanning direction change detecting position for detecting the size of the original D. In the present embodiment, the size detecting position SDP is a position 20 mm rightward from the position of the original abutting portion 112 in the sub-scanning direction SS. At the size detecting position SDP, to identify the size in six types in the main scanning direction MS, six detecting positions 301 to 306 illustrated in FIG. 6A are provided. Concerning the main scanning direction MS, six sampling values corresponding to the detecting positions 301 to 306 illustrated in FIG. 6A are extracted from sampling values of first sampling after the lamp 102 is turned on by the image processing unit 206, and set as detection data initial values H0 [i] (i=1 to 6). Further, in the present embodiment, detection data H1 [i] (i=1 to 6) is overwritten with six sampling values corresponding to the detecting positions 301 to 306 extracted from sampling values of second and subsequent sampling, and stored every time. Concerning the sub-scanning direction SS, in the present embodiment, the size is detected from output of the reflective type sensor 108 disposed at a position (detecting position) 300 away from the position of the original abutting portion 112 by a predetermined distance (in the present embodiment 239.5 mm). An initial value of the reflective type sensor 108 concerning the sub-scanning direction SS is stored in a detection data initial value V0, and sampling values after the initial value are stored in detection data V1. FIG. 6B is a diagram illustrating an example of a size candidate for a standard-size original determined from the detection data at the detecting positions 301 to 306 in the main scanning direction MS.

Procedure of the original size detecting operation will be described below. Normally, in the case in which an image of the original D is read by the image reading apparatus 100, the user executes operation of opening the pressure plate 109, placing the original D on the platen glass plate 103 and closing the pressure plate 109. During this operation, by the pressure plate 109 being open at an angle greater than 25°, the first sensor 110 and the second sensor 111 output OFF signals as illustrated in FIG. 3. The state of the pressure plate 109 transitions to the open state. After the original D is placed on the platen glass plate 103, at a time point at which the angle of the pressure plate 109 becomes equal to or less than 25° by the user closing the pressure plate 109, the first sensor 110 outputs an ON signal, the second sensor 111 outputs an OFF signal, and the pressure plate 109 is put into the closing state. If the user further closes the pressure plate 109, at a time point at which the angle of the pressure plate 109 becomes equal to or less than 5°, the first sensor 110 and the second sensor 111 output ON signals, and the pressure plate 109 is put into the closed state. The scanner unit 101 executes original size detection control as described below by being triggered by change of the state of the pressure plate 109.

Figures 7, 7A:
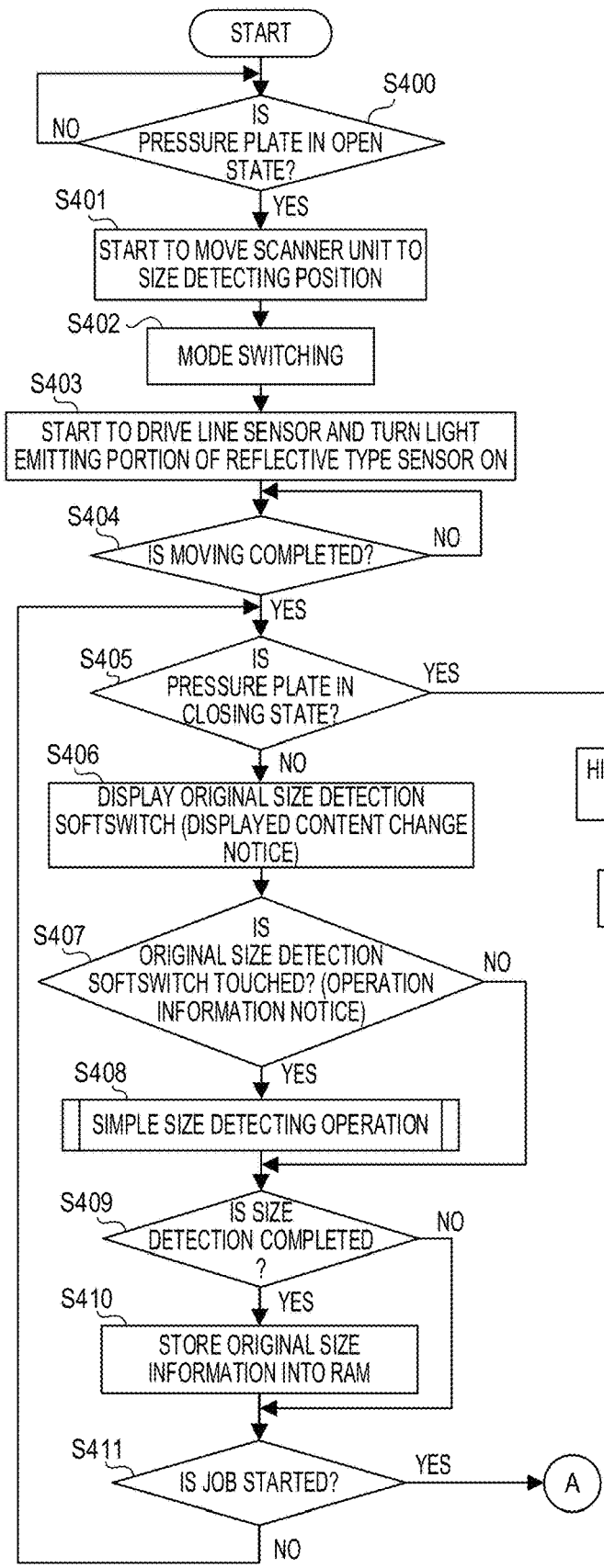
FIG. 7 which is composed of FIG. 7A
Figure 7B:
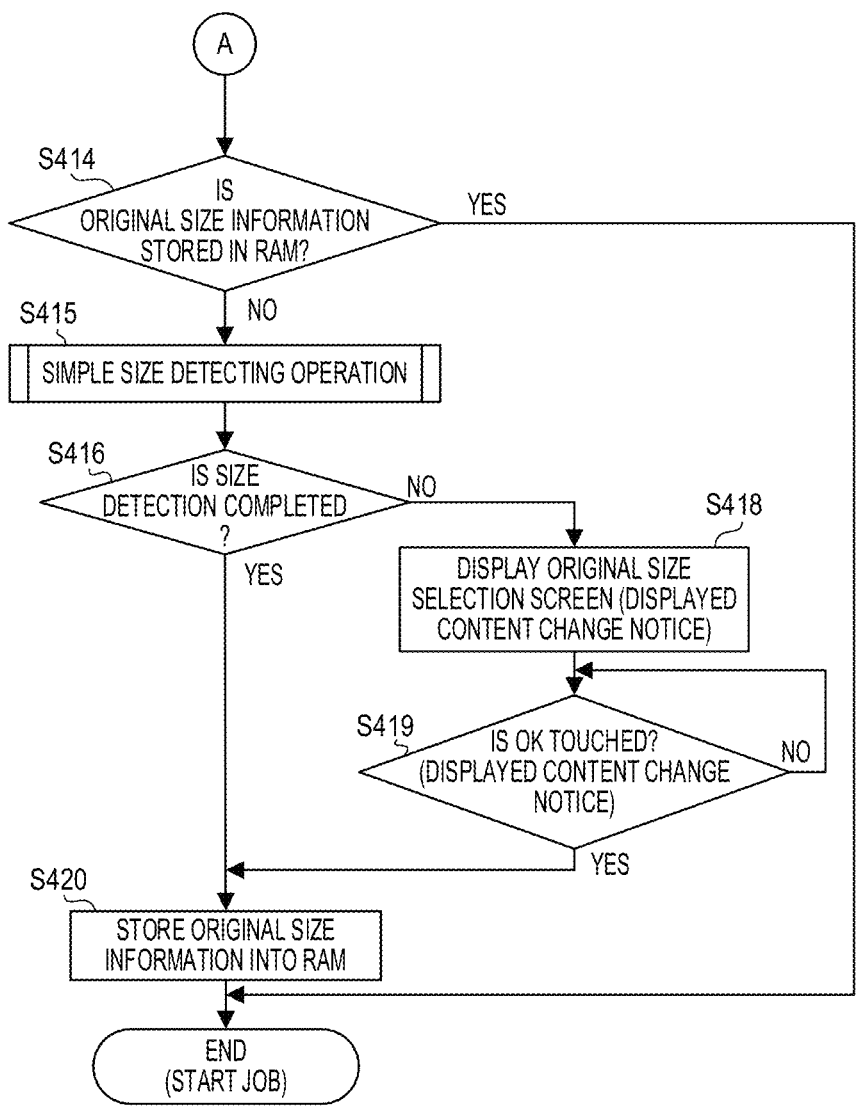
FIG. 7B is a flowchart illustrating original size detecting operation when the state of the pressure plate changes from a closed state to an open state.

FIG. 7 which is composed of FIG. 7A and FIG. 7B is a flowchart illustrating original size detecting operation when the state of the pressure plate 109 changes from the closed state to the open state. By being triggered by the state of the pressure plate 109 changing from the closed state to the closing state and then the open state, the CPU 201 starts the original size detecting operation. The CPU 201 executes the original size detecting operation according to the program stored in the ROM 202. In FIG. 7A, if it is detected that the pressure plate 109 is in the open state (S400: Yes), the CPU 201 moves the scanner unit 101 to the size detecting position SDP 20 mm rightward from the position of the original abutting portion 112 (S401). While the scanner unit 101 is moving, an operation mode of the line sensor 107 is switched to a color mode (S402). Then, the CPU 201 starts drive of the line sensor 107 and turns on a light emitting portion of the reflective type sensor 108 (S403). The CPU 201 prepares so that initial sampling can be executed immediately after the state of the pressure plate 109 transitions to the closing state.

Start of drive of the line sensor 107 will be described below. In a standby state, power supply to the line sensor 107 and the analog signal processing unit 205 illustrated in FIG. 4 is turned off. Therefore, in order to read an image signal to execute sampling, the CPU 201 first supplies power to the line sensor 107 and the analog signal processing unit 205, and, then, performs setting for operation, and supplies clock to start drive of the line sensor 107. Because the setting for operation performed on the line sensor 107 is executed through serial communication, it takes time compared to normal setting of a register. Further, because the line sensor 107 and the analog signal processing unit 205 are analog circuits, upon power supply and upon clock supply, waiting time is required until output signals of the line sensor 107 and the analog signal processing unit 205 become stable. Including these communication time and waiting time, approximately 50 msec is required from start of drive of the line sensor 107 until actual sampling.

In a state in which the processing in S403 and movement of the line sensor 107 to the size detecting position SDP are finished (S404: Yes), the CPU 201 determines whether or not the state of the pressure plate 109 transitions to the closing state (S405). In the case in which it is detected that the angle of the pressure plate 109 is equal to or less than 25° (equal to or less than a predetermined angle) based on output of the first sensor 110 and the second sensor 111, the CPU 201 determines that the state of the pressure plate 109 transitions to the closing state. In the case in which the state of the pressure plate 109 transitions to the closing state (S405: Yes), the CPU 201 issues a displayed content change notice to the CPU 2001, and hides the original size detection softswitch (softkey) 720 as illustrated in FIG. 5C (S412). The original size detection softswitch 720 will be described later. The CPU 201 executes normal size detecting operation (S413). The normal size detecting operation will be described later with reference to FIG. 9 which is composed of FIG. 9A and FIG. 9B. The CPU 201 stores original size information in the RAM 203 (S421). The CPU 201 finishes the original size detecting operation and puts the image reading apparatus 100 into a standby state.

The CPU 201 determines whether or not the state of the pressure plate 109 changes to the closing state (S405) and determines whether or not a job start instruction for giving an instruction of start of image reading job is received (S411). The image reading job may be job of reading the image of the original or may be copy job of reading the image of the original and forming an image based on the read image data. Operation from S405 to S411 will be described below. In the present embodiment, in the case in which the angle of the pressure plate 109 is greater than the predetermined angle (25°), that is, in the case in which the pressure plate 109 is in the open state, power consumption is reduced by performing simple size detecting operation instead of the normal size detecting operation.

In the case in which it is detected that the angle of the pressure plate 109 is greater than 25° (predetermined angle) based on the output of the first sensor 110 and the second sensor 111, the CPU 201 determines that the state of the pressure plate 109 does not transition to the closing state. In the case in which the state of the pressure plate 109 does not transition to the closing state (S405: No), the CPU 201 issues a displayed content change notice to the CPU 2001 of the controller portion 2000, and displays the original size detection softswitch 720 as illustrated in FIG. 5B (S406). The original size detection softswitch 720 is a softkey (button) having an arbitrary image displayed at the display unit 711 to accept a size detection start instruction from the user. The CPU 201 determines whether or not the original size detection softswitch 720 is touched (S407). In the case in which the original size detection softswitch 720 is touched and an operation information notice is issued from the CPU 2001 (S407: Yes), the CPU 201 executes the simple size detecting operation (S408). The original size detection softswitch 720 functions as a size detection start instructing unit which gives an instruction of start of the simple size detecting operation. The CPU 201 functions as an automatic original size detecting unit which automatically detects a size of the original D by executing the simple size detecting operation. The simple size detecting operation will be described in detail later with reference to FIG. 12. The CPU 201 determines whether or not the size of the original D can be detected through the simple size detecting operation (S409). Meanwhile, also in the case in which the original size detection softswitch 720 is not touched for a predetermined time period (S407: No), the processing proceeds to S409, and it is determined whether or not the size of the original D has been already detected through the simple size detecting operation.

In the case in which the size of the original D can be detected through the simple size detecting operation (in the case in which the size is not detected as unfixed) (S409: Yes), the CPU 201 stores original size information detected through the simple size detecting operation in the RAM 203 (S410). At this time, the CPU 201 notifies the CPU 2001 of the controller portion 2000 of the original size information. For example, in the case in which the original size information is "A4", the CPU 2001 displays the original size information of "A4" at the display unit 711 as illustrated in FIG. 5D. The CPU 201 determines whether or not the image reading job (hereinafter, referred to as job) is started (S411). Whether or not the job is started is determined based on whether or not the start key 706 is depressed. The CPU 201 repeats the standby state from S405 to S411 until the state of the pressure plate 109 changes to the closing state or the job is started.

In the case in which it is determined that the job is started by the start key 706 being depressed (S411: Yes), the CPU 201 proceeds with the processing to S414. The CPU 201 determines whether or not the original size information is stored in the RAM 203 (S414). In the case in which the original size information is stored in the RAM 203 (S414: Yes), the CPU 201 finishes the original size detecting operation and starts image reading operation based on the original size information. In this case, the image reading job (image reading operation) is started as the pressure plate 109 is open. Meanwhile, in the case in which the original size information is not stored in the RAM 203 (S414: No), the CPU 201 executes the simple size detecting operation (S415).

The CPU 201 functions as an automatic original size detecting unit which automatically detects the size of the original D by executing the simple size detecting operation. In the case in which the size of the original can be detected through the simple size detecting operation (in the case in which the size is not detected as unfixed) (S416: Yes), the CPU 201 stores the original size information detected through the simple size detecting operation in the RAM 203 (S420). The CPU 201 finishes the original size detecting operation and starts image reading operation based on the original size information. In this case, the image reading operation is started as the pressure plate 109 is open.

Figure 8A:
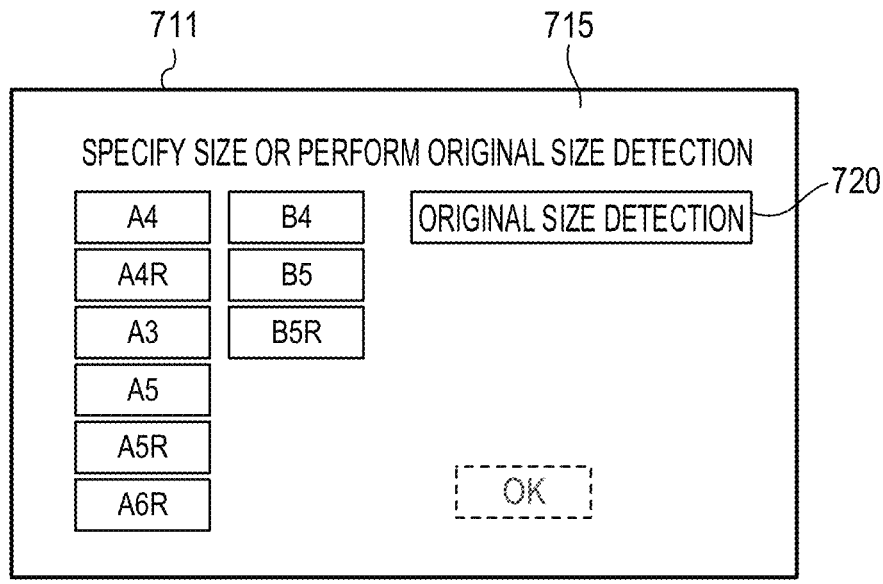
FIG. 8A and FIG. 8B are diagrams illustrating an example of an original size selection screen displayed at the display unit.
Figure 8B:
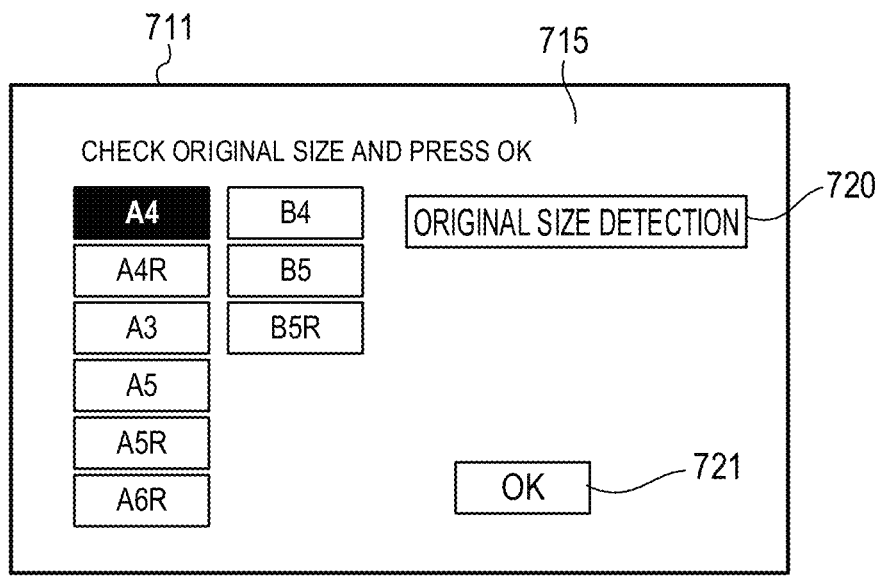

Meanwhile, in the case in which the size of the original cannot be detected through the simple size detecting operation (in the case in which the size is detected as unfixed) (S416: No), the CPU 201 issues a displayed content change notice to the CPU 2001 of the controller portion 2000 (S418). FIG. 8A and FIG. 8B are diagrams illustrating an example of the original size selection screen 715 displayed at the display unit 711. The original size selection screen 715 includes a plurality of softswitches which respectively indicate different sizes. The CPU 2001 displays the original size selection screen 715 illustrated in FIG. 8A at the display unit 711 (S418). The original size selection screen 715 functions as a manual size instructing unit which is used by the user to manually give an instruction of the size of the original D. As illustrated in FIG. 8A, a softswitch indicating the size of the original is displayed at the display unit 711. Note that, at this time, the original size detection softswitch 720 is also displayed at the display unit 711, and the simple size detecting operation can be also executed. When the user touches the softswitch indicating the size of the original which the user desires to select, a displayed content change notice is transmitted from the display unit 711 to the CPU 2001. Further, an operation information notice is transmitted from the CPU 2001 to the display unit 711, and, as illustrated in FIG. 8B, an OK softswitch 721 at a lower right portion of the display unit 711 is activated.

The CPU 2001 determines whether or not the user touches the OK softswitch 721 (S419). If the user touches the OK softswitch 721, the size of the original is fixed. The CPU 2001 transmits the operation information notice including the original size information to the CPU 201. The CPU 201 stores the received original size information in the RAM 203 (S420). The CPU 201 finishes the original size detecting operation and starts image reading operation based on the original size information. In this case, the image reading operation is started as the pressure plate 109 is open.

<<Normal Size Detecting Operation>>

Figure 9B:
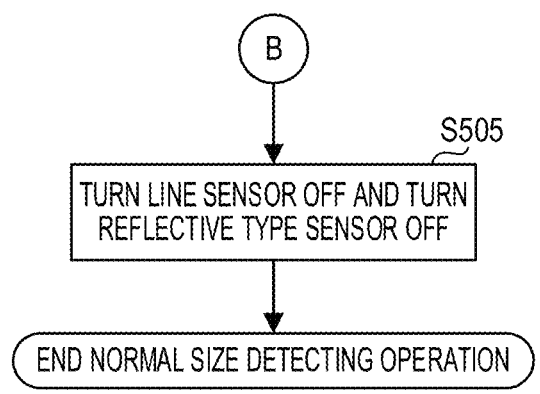
FIG. 9B is a flowchart illustrating normal size detecting operation.

The normal size detecting operation in S413 in FIG. 7A will be described below with reference to FIG. 9 which is composed of FIG. 9A and FIG. 9B. FIG. 9A and FIG. 9B are flowcharts illustrating the normal size detecting operation. The CPU 201 executes the normal size detecting operation according to the program stored in the ROM 202. The normal size detecting operation is started by being triggered by the state of the pressure plate 109 changing from the closed state to the closing state. When the normal size detecting operation is started, the CPU 201 detects external light entering the platen glass plate 103 from outside of the image reading apparatus 100 (S501). In detection of external light, the CPU 201 samples the initial value of the reflective type sensor 108 regarding the sub-scanning direction SS and, at the same time, samples the detection data initial values H0 [i] (i=1 to 6) of the line sensor 107 in a state in which the lamp 102 is not turned on.

Figure 10A:
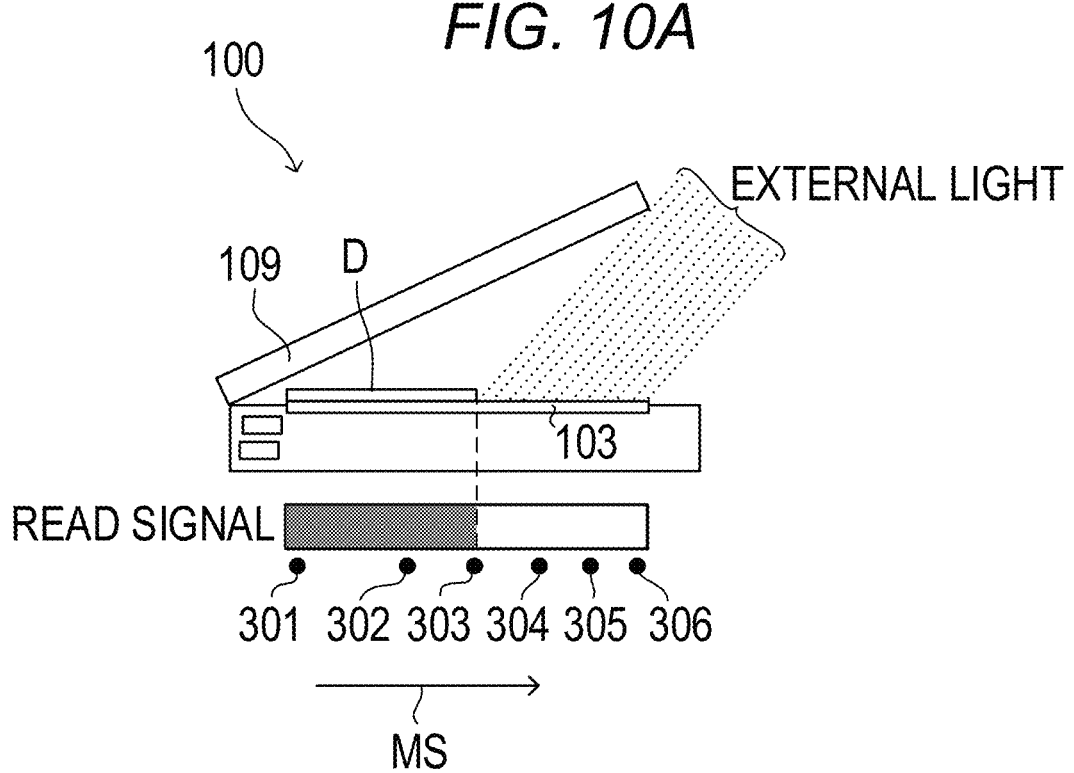
FIG. 10A and FIG. 10B are diagrams illustrating an example of external light detection.
Figure 10B:
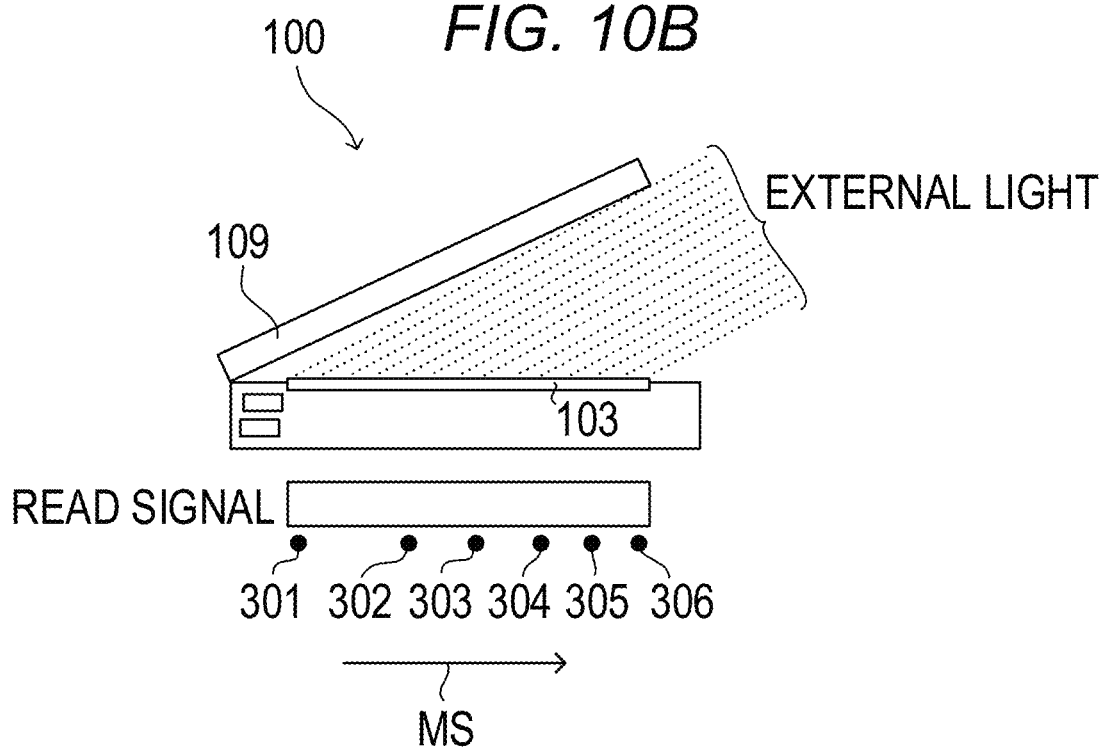

The detection of external light will be described below. FIG. 10A and FIG. 10B are diagrams illustrating an example of the detection of external light. In the detection of external light, because the lamp 102 of the scanner unit 101 is in an OFF state, normally, read-out signals of "black" are output from all regions of the line sensor 107. However, in the case in which external light enters the platen glass plate 103 from outside of the image reading apparatus 100, there is a case in which read-out signals of "white" are output on the front side of the platen glass plate 103. For example, in the case in which external light is incident on the platen glass plate 103 of the image reading apparatus 100 as illustrated in FIG. 10A in a state in which the pressure plate 109 is in the closing state, read-out signals of "white" are output although the original D does not exist at the detecting positions 304, 305 and 306 in the main scanning direction MS. This becomes a cause of erroneous determination in detection of the size of the original.

Therefore, in the case in which external light is detected in a state in which the pressure plate 109 is in the closing state, the following processing is performed. In the case in which external light is detected over the whole range of the line sensor 107 in the main scanning direction MS as illustrated in FIG. 10B (S503: Yes), the CPU 201 sets "size unfixed" as the size detection result (S504), because the original D is not placed on the platen glass plate 103. The CPU 201 turns off the line sensor 107 and the reflective type sensor 108 (S505) and finishes the normal size detecting operation. Meanwhile, in the case in which external light is not detected over the whole range of the line sensor 107 in the main scanning direction MS (S503: No), the CPU 201 determines whether or not external light is detected at part of the line sensor 107 in the main scanning direction MS (S507). In the case in which external light is detected at part of the line sensor 107 in the main scanning direction MS as illustrated in FIG. 10A (S507: Yes), the size of the original D is determined while it is determined that the original D does not exist until a boundary of a region in which external light is incident and the original D exists on the back side of the boundary (S508). The CPU 201 turns off the line sensor 107 and the reflective type sensor 108 (S505) and finishes the normal size detecting operation.

In the case in which external light is not incident on the platen glass plate 103 (S507: No), the CPU 201 turns on the lamp 102 of the scanner unit 101 (S509). In a state in which the lamp 102 is turned on, the CPU 201 executes initial sampling (generates a reference value) (S510). In the initial sampling, the CPU 201 reads image signals in the main scanning direction MS output from the line sensor 107, acquires sampling values from the reflective type sensor 108 and stores these in the RAM 203 as the initial sampling values (S510). Initial values of six detecting positions 301 to 306 regarding the main scanning direction MS are respectively stored in the detection data initial values H0 [i] (i=1 to 6). Initial values of the reflective type sensor 108 regarding the sub-scanning direction SS are stored in the detection data initial values V0.

Thereafter, the CPU 201 determines whether or not the pressure plate 109 is put into the closed state (S511). In the present embodiment, at a time point at which the angle of the pressure plate 109 becomes equal to or less than 5°, it is determined that the pressure plate 109 is put into the closed state. In the case in which the pressure plate 109 is no in the closed state (S511: No), the CPU 201 determines whether or not a predetermined time period (in the present embodiment, five seconds) has elapsed since the pressure plate 109 was put into the closing state (S512). In the case in which the predetermined time period has elapsed without the pressure plate 109 being put into the closed state (S512: Yes), because a state can be assumed where the pressure plate 109 cannot be fully closed by a thick book, or the like, being put between the pressure plate 109 and the platen glass plate 103, the CPU 201 sets "size unfixed" as the size detection result (S518). The CPU 201 turns off the lamp 102 (S519). The CPU 201 turns off the line sensor 107 and the reflective type sensor 108 (S505) and finishes the normal size detecting operation.

Meanwhile, in the case in which the pressure plate 109 is put into the closed state (S511: Yes), the CPU 201 executes sampling operation respectively regarding the above-described main scanning and sub-scanning (S513). The CPU 201 stores acquired data regarding the main scanning direction MS in the detection data H1 [i] (i=1 to 6), and stores acquired data regarding the sub-scanning direction SS in the detection data V1. Thereafter, if sampling end conditions (S514 to S516) which will be described later are not satisfied, the CPU 201 executes the next sampling operation (S513) with a fixed period, in the present embodiment, after standing by for 50 msec (S520). The sampling operation is executed every 50 msec until the sampling end conditions are satisfied.

Confirmation of sampling operation end conditions (S514 to S516) is performed through the following procedure. It is determined whether or not a predetermined time period (in the present embodiment, two seconds) has elapsed since the pressure plate 109 was put into the closed state (S511: Yes) (S514). In the case in which the predetermined time period has elapsed (S514: Yes), the CPU 201 fixes the size through size fixing calculation which will be described later based on the detection data initial values H0 [i] (i=1 to 6), H1 [i] (i=1 to 6), V0 and V1 (S517). The CPU 201 stores the fixed size in the RAM 203. In the case in which the predetermined time period has not elapsed (S514: No), the CPU 201 determines whether or not job is started (S515). In the case in which the job is started (S515: Yes), the CPU 201 fixes the size through the size fixing calculation which will be described later based on the detection data initial values H0 [i] (i=1 to 6), H1 [i] (i=1 to 6), V0 and V1 (S517). The CPU 201 stores the fixed size in the RAM 203. The CPU 201 turns off the lamp 102 (S519). The CPU 201 turns off the line sensor 107 and the reflective type sensor 108 (S505) and finishes the normal size detecting operation.

Meanwhile, in the case in which the job is not started (S515: No), the CPU 201 determines whether or not the state of the pressure plate 109 is changed from the closed state to the closing state or the opening state (S516). In the case in which the pressure plate 109 is open again, and the state transitions to the closing state or the open state (S516: Yes), the CPU 201 sets "size unfixed" as the size detection result (S518), because there is a possibility that the position and the state of the original D may change as a result of the pressure plate 109 being opened again after being closed once. Thereafter, the CPU 201 turns off the lamp 102 (S519). The CPU 201 turns off the line sensor 107 and the reflective type sensor 108 (S505) and finishes the normal size detecting operation.

<<<Size Fixing Calculation>>>

Figure 11A:
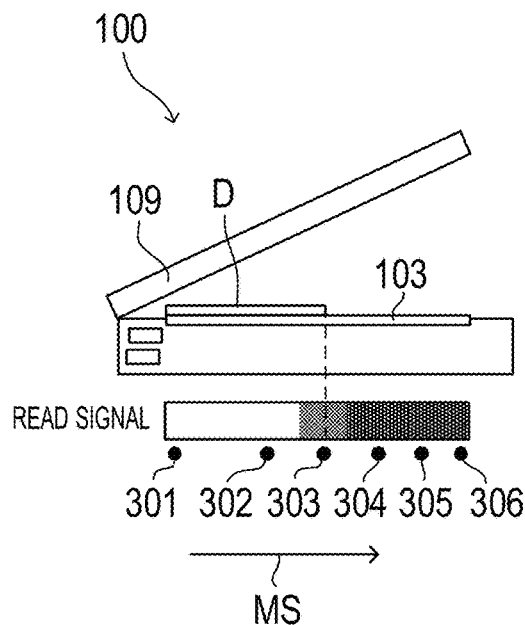
FIG. 11A, FIG. 11B and FIG. 11C are explanatory diagrams of a read-out signal which changes between a closing state and the closed state of the pressure plate.
Figure 11B:
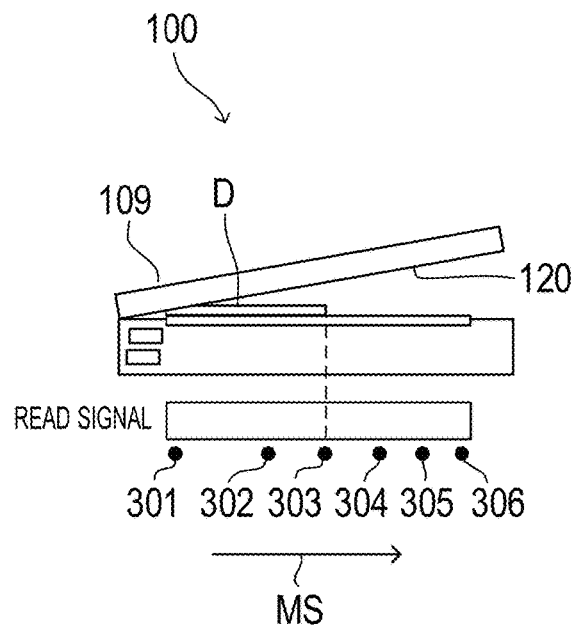
Figure 11C:
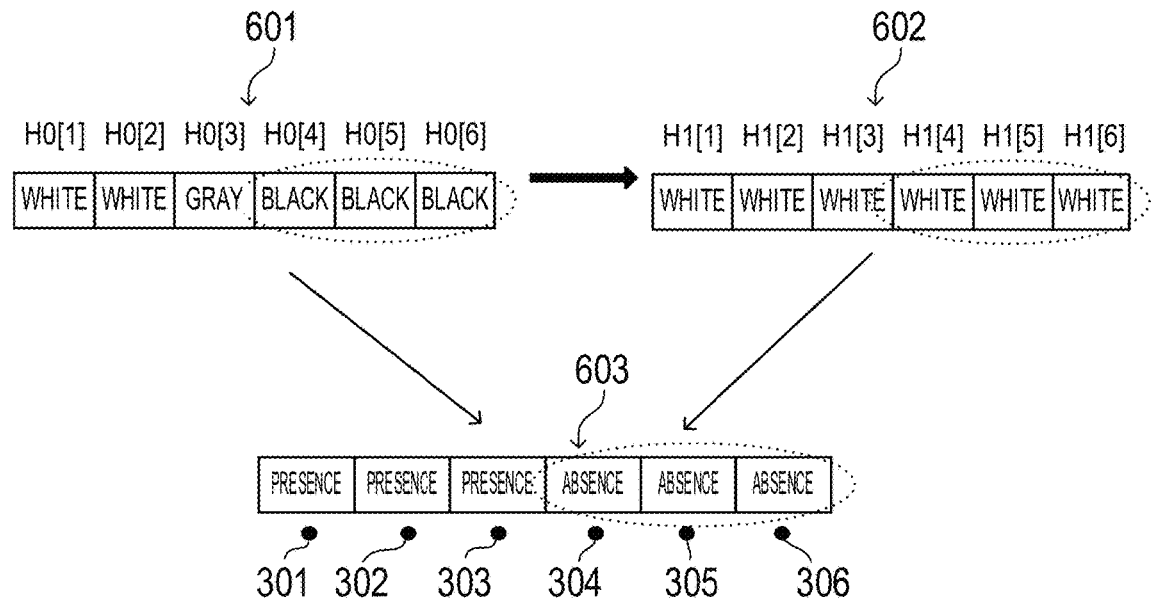

The size fixing calculation in S517 in FIG. 9A will be described below with reference to FIG. 11A, FIG. 11B and FIG. 11C. FIG. 11A, FIG. 11B and FIG. 11C are explanatory diagrams of the read-out signal which changes between the closing state and the closed state of the pressure plate 109. FIG. 11A is a diagram illustrating the image reading apparatus 100 in a state in which the pressure plate 109 is in the closing state and a read-out signal output from the line sensor 107. FIG. 11B is a diagram illustrating the image reading apparatus 100 in a state in which the pressure plate 109 is in the closed state and a read-out signal output from the line sensor 107. FIG. 11C is a diagram illustrating a read-out signal 601 in a state in which the pressure plate 109 is in the closing state, a read-out signal 602 in a state in which the pressure plate 109 is in the closed state and a calculation result 603 of the size fixing calculation.

The detection data initial values H0 [i] (i=1 to 6) regarding the main scanning direction MS of the read-out signal 601 and the detection data H1 [i] (i=1 to 6) regarding the main scanning direction MS of the read-out signal 602 are compared with a white threshold W and a black threshold B set in advance, and are made three values of white, gray and black. In the case in which external light is incident on the platen glass plate 103, processing in S503, S504, S507 and S508 in FIG. 9A is executed. Meanwhile, in the case in which external light is not incident on the platen glass plate 103, the size fixing calculation is executed based on the detection data initial values H0 [i] and H1 [i] (i=1 to 6).

That is, when the pressure plate 109 is in the closing state as illustrated in FIG. 11A, because reflected light from the original D does not enter the line sensor 107 at a portion in which the original D does not exist, the read-out signal is recognized as "black" as indicated by the read-out signal 601 in FIG. 11C. Meanwhile, when the pressure plate 109 is in the closed state as illustrated in FIG. 11B, because reflected light from the back side 120 of the pressure plate 109 enters the line sensor 107 at a portion in which the original D does not exist, the read-out signal is recognized as "white" as indicated by the read-out signal 602 in FIG. 11C. That is, it is determined that "an original does not exist" at the detecting positions 304, 305 and 306 in which the read-out signals are changed from "black" to "white" as a result of the detection data initial values H0 [i] being compared with the detection data H1 [i]. Further, at a portion in which the original D exists, because reflected light from the original D enters the line sensor 107 regardless of the open/closed state of the pressure plate 109, there is no change between the detection data initial values H0 [i] and the detection data H1 [i]. In the calculation result 603 illustrated in FIG. 11C, because the original D exists at the detecting positions 301 to 303, and the original D does not exist at the detecting positions 304 to 306, it is determined that the detected size of the original is B6 or B5R.

In the size fixing calculation regarding the sub-scanning direction SS, comparison between the detection data initial values V0 and the detection data V1 is executed. The reflective type sensor 108 is ON in the case in which the original D or the pressure plate 109 exists on the platen glass plate 103, and is OFF in the case in which neither the original D nor the pressure plate 109 exists on the platen glass plate 103. Therefore, in the case in which the detection data initial values V0 are OFF, and the detection data V1 is ON, it is determined that the original D does not exist at a position 300 of the reflective type sensor 108. Because the original D does not exist at the position 300 of the reflective type sensor 108, it is determined that the detected size of the original is not B5R, but B6. In this manner, the size of the original D can be obtained through the size fixing calculation.

<<Simple Size Detecting Operation>>

Figure 12:
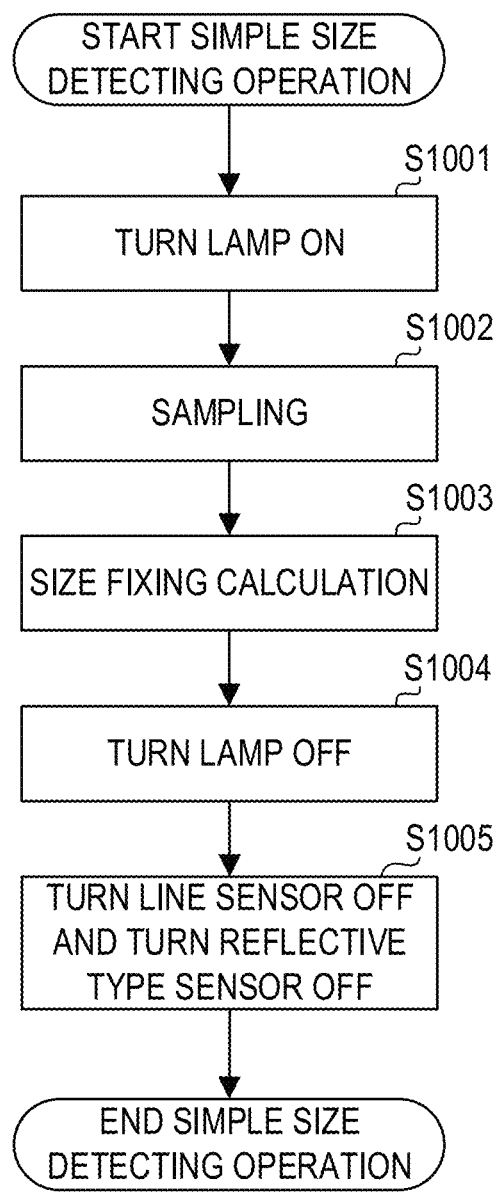
FIG. 12 is a flowchart illustrating simple size detecting operation.

The simple size detecting operation in S408 and S415 in FIG. 7A and FIG. 7B will be described below. FIG. 12 is a flowchart illustrating the simple size detecting operation. The CPU 201 executes the simple size detecting operation according to the program stored in the ROM 202. When the simple size detecting operation is started, the CPU 201 turns on the lamp 102 (S1001). The CPU 201 samples initial values of the six detecting positions 301 to 306 regarding the main scanning direction MS and samples initial values of the reflective type sensor 108 regarding the sub-scanning direction SS (S1002). In the simple size detecting operation, unlike with the normal size detecting operation, sampling is performed only once in a state in which the pressure plate 109 is open. The CPU 201 stores the initial values of the six detecting positions 301 to 306 regarding the main scanning direction MS respectively in the detection data initial values H0 [i] (i=1 to 6) and stores the initial values of the reflective type sensor 108 regarding the sub-scanning direction SS in the detection data initial values V0. The CPU 201 executes the size fixing calculation which will be described later based on the detection data initial values H0 [i] (i=1 to 6) and the detection data initial values V0 (S1003). The CPU 201 stores the fixed size in the RAM 203. The CPU 201 turns off the lamp 102 (S1004). The CPU 201 turns off the line sensor 107 and the reflective type sensor 108 (S1005) and finishes the simple size detecting operation.

<<<Size Fixing Calculation>>>

Figure 13A:
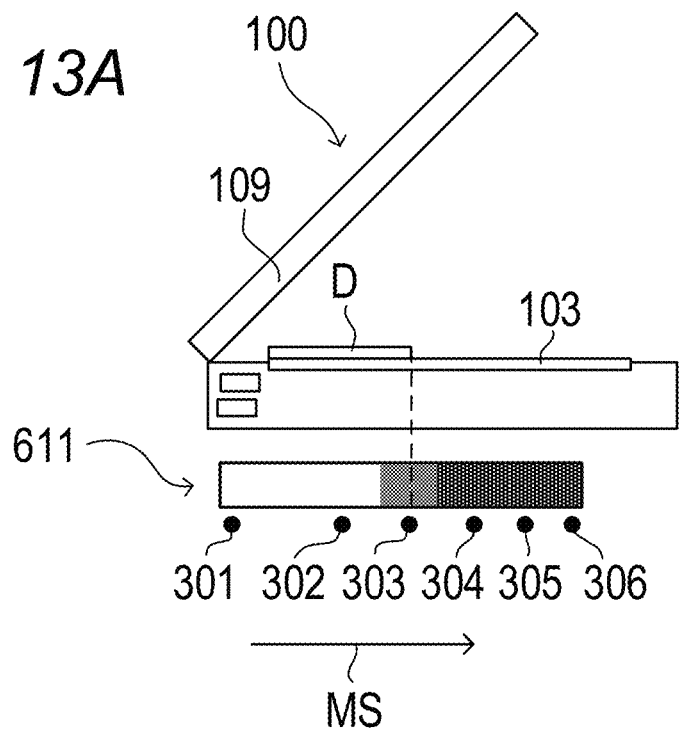
FIG. 13A and FIG. 13B are explanatory diagrams of size fixing calculation in the simple size detecting operation.
Figure 13B:
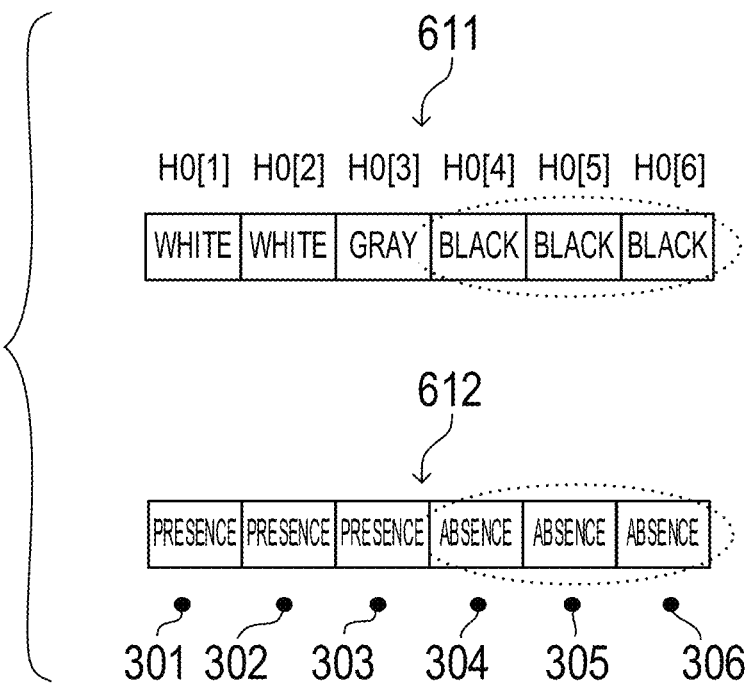

The size fixing calculation in S1003 in FIG. 12 will be described below with reference to FIG. 13A and FIG. 13B. FIG. 13A and FIG. 13B are explanatory diagrams of the size fixing calculation in the simple size detecting operation. FIG. 13A is a diagram illustrating the image reading apparatus 100 in a state in which the pressure plate 109 is in the open state and a read-out signal 611 output from the line sensor 107. FIG. 13B is a diagram illustrating the read-out signal 611 in a state in which the pressure plate 109 is in the open state and a calculation result 612 of the size fixing calculation.

Because the detection data is sampled only once in the simple size detecting operation, it cannot be determined whether or not the original D exists from change of the detection data. Therefore, the size is fixed on the supposition that most of the originals D are "not black", and a portion in which the read-out signals are "black" is determined as "an original does not exist" in an expedient manner. Each of the detection data initial values H0 [i] (i=1 to 6) regarding the main scanning direction MS in the read-out signal 611 is compared with the white threshold W and the black threshold B set in advance, and made three values of white, gray and black. A portion in which the read-out signals are "black" indicated by the read-out signal 611 in FIG. 13B is determined as "an original does not exist" indicated in the calculation result 612. In the calculation result 612, because the original D exists at the detecting positions 301 to 303 and the original D does not exist at the detecting positions 304 to 306, it is determined that the detected size of the original is B6 or B5R. Note that, in the case in which it cannot be distinguished between "an original exists" and "an original does not exist" in the read-out signal 611 made three values based on the white threshold W and the black threshold B, the CPU 201 determines that the size cannot be detected (size unfixed).

The size fixing calculation regarding the sub-scanning direction SS is executed based on the detection data initial values V0. The reflective type sensor 108 is ON in the case in which the original D exists on the platen glass plate 103, and is OFF in the case in which the original D does not exist on the platen glass plate 103. Therefore, in the case in which the detection data initial values V0 are OFF, it is determined that the original D does not exist at the position 300 of the reflective type sensor 108. Because the original D does not exist at the position 300 of the reflective type sensor 108, it is determined that the detected size of the original is not B5R, but B6. In this manner, the size of the original D can be obtained through the size fixing calculation.

According to the present embodiment, it is possible to display the original size detection softswitch 720 at the display unit 711 when the pressure plate 109 is in the open state, and it is possible to delete the original size detection softswitch 720 from the display unit 711 when the pressure plate 109 is closed, and the angle of the pressure plate 109 becomes equal to or smaller than the predetermined angle. Therefore, the user can execute the simple size detecting operation by touching the original size detection softswitch 720 when the pressure plate 109 is in the open state. By this means, it is not necessary to always execute the normal size detecting operation when the pressure plate 109 is in the open state, so that it is possible to reduce power consumption. Further, by displaying the original size detection softswitch 720 at the display unit 711 only when the pressure plate 109 in the open state, it is possible to provide operability which is easy to understand for the user.

Further, in the case in which the size of the original D is not detected through the simple size detecting operation when copy job is started as the pressure plate 109 remains to be in the open state, it is possible to display the original size selection screen 715 at the display unit 711. Therefore, in the case in which the size of the original D is not automatically detected when the pressure plate 109 is in the open state, the user can manually designate the size of the original D from the original size selection screen 715. By this means, it is not necessary to always execute the normal size detecting operation when the pressure plate 109 is in the open state, so that it is possible to reduce power consumption.

According to the related art, when the pressure plate 109 is in the open state, that is, when an opening angle of the pressure plate 109 is equal to or greater than the predetermined angel, the normal size detecting operation is always executed. In contrast to this, according to the present embodiment, even in the case in which the user leaves the pressure plate 109 in the open state, it is possible to prevent a situation in which power is kept supplied to the line sensor 107, so that it is possible to reduce power consumption.

According to the present embodiment, it is possible to reduce power consumed for operation of detecting the size of the original placed on the platen glass plate 103 when the pressure plate 109 is in the open state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-248450, filed Dec. 25, 2017, which is hereby incorporated by reference herein in its entirety.

What is claimed is:

1. An image reading apparatus comprising:
a platen glass plate on which an original is to be placed;
an original positioning portion which determines a position of the original to be placed on the platen glass plate;
a pressure plate which is rotatably provided so as to open and close the platen glass plate and which holds the original placed on the platen glass plate;
a light source which illuminates the original placed on the platen glass plate;
a line image sensor which includes a plurality of light receiving portions arranged side by side in a main scanning direction and which receives a light reflected from the original illuminated by the light source to generate image data;
a sensor which detects that an angle formed by the pressure plate;
an original size detector which is disposed at a detecting position which is away from the original positioning portion by a predetermined distance in a sub-scanning direction orthogonal to the main scanning direction;
an operating unit including a display and configured to receive:
a user's first instruction for starting an image reading operation of reading an image of the original, and
a user's second instruction for executing an operation of detecting a size of the original,
a memory which stores the size of the original; and
a controller configured to:
in a case in which the angle is greater than a predetermined angle, display on the display a softswitch for receiving the user's second instruction,
in a case in which the angle is greater than the predetermined angle and the user's second instruction is received, determine the size of the original based on a detection result of the line image sensor and a detection result of the original size detector, and
in a case in which the angle is smaller than the predetermined angle, not display the softswitch on the display or disable the softswitch and determine the size of the original based on the detection result of the line image sensor and the detection result of the original size detector without the user's second instruction.

2. The image reading apparatus according to claim 1, wherein the controller stores the size of the original determined by the controller in the memory and starts the image reading operation according to the size stored in the memory.

3. The image reading apparatus according to claim 1, wherein, in a case in which the controller cannot determine the size of the original based on the detection result of the line image sensor and the detection result of the original size detector, the controller displays on the display unit an original size selection screen to be used by the user to manually select the size of the original.

4. The image reading apparatus according to claim 3, wherein the controller stores the size of the original selected by the user in the memory and starts the image reading operation according to the size stored in the memory.

5. The image reading apparatus according to claim 1, wherein the display displays the size of the original determined by the controller.

6. The image reading apparatus according to claim 1, wherein the operating unit includes a start key configured to receive the user's first instruction.

7. The image reading apparatus according to claim 1, wherein the operating unit includes a touch panel sensor.

* * * * *